(12) United States Patent
Bishop et al.

(10) Patent No.: US 6,798,992 B1
(45) Date of Patent: *Sep. 28, 2004

(54) METHOD AND DEVICE FOR OPTICALLY CROSSCONNECTING OPTICAL SIGNALS USING TILTING MIRROR MEMS WITH DRIFT MONITORING FEATURE

(75) Inventors: David John Bishop, Summit, NJ (US); Randy Clinton Giles, Whippany, NJ (US)

(73) Assignees: Agere Systems Inc., Allentown, PA (US); Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/518,070

(22) Filed: Mar. 2, 2000

Related U.S. Application Data

(60) Provisional application No. 60/164,459, filed on Nov. 10, 1999.

(51) Int. Cl.[7] ................................................ H04J 14/00
(52) U.S. Cl. ............................. 398/45; 398/50; 398/52; 398/55; 398/56; 398/12; 398/19; 398/47; 398/48; 398/46; 385/16; 385/17; 385/18; 385/19; 385/20; 385/21; 385/22; 385/23; 385/24; 385/33; 385/119; 356/73.1

(58) Field of Search ............................. 398/45, 46, 49, 398/48, 50, 52, 55, 56, 12, 19; 356/73.1; 385/16, 17, 18, 19, 20–24, 33, 119

(56) References Cited

U.S. PATENT DOCUMENTS

| 6,198,856 | B1 | * | 3/2001 | Schroeder et al. ............ 385/17 |
| 6,301,402 | B1 | * | 10/2001 | Bhalla et al. ................. 385/16 |
| 6,411,751 | B1 | * | 6/2002 | Giles et al. ................... 385/16 |
| 6,424,757 | B1 | * | 7/2002 | Sparks et al. ................. 385/16 |

OTHER PUBLICATIONS

U.S. application No. 09/512174 (Aksyuk et al) filed on Feb. 24, 2000.*

* cited by examiner

Primary Examiner—Hanh Phan

(57) ABSTRACT

A device and method for detecting rotational drift of mirror elements in a MEMS tilt mirror array used in an optical crossconnect. The optical crossconnect directs optical signals from an input fiber to an output fiber along an optical path by rotatably positioning mirror elements in desired positions. A monitoring device disposed outside of the optical path is used to obtain images of the MEMS array or to transmit and receive a test signal through the crossconnect for detecting the presence of mirror element drift.

16 Claims, 2 Drawing Sheets

METHOD AND DEVICE FOR OPTICALLY CROSSCONNECTING OPTICAL SIGNALS USING TILTING MIRROR MEMS WITH DRIFT MONITORING FEATURE

This application is based on U.S. Provisional Application Ser. No. 60/164,459 filed on Nov. 10, 1999.

BACKGROUND OF THE INVENTION

1. Field of the Invention

The present invention pertains to fiber optic communications systems and, more particularly, to monitoring devices and methods for monitoring shifts in optical crossconnect configurations utilizing micro electromechanical systems (MEMS) tilting mirror arrays.

2. Description of the Related Art

In fiber optic communication systems, signal routing is essential for directing an optical signal carrying data to an intended location. Existing routing techniques typically experience optical power loss due to inefficient coupling of optic signals between input and output fibers. This increases the dependence on optical power sources (e.g., pump lasers) which are used to compensate for power losses by injecting optical power back into the optical system. The need for optical power sources increases the overall cost of the optical system.

Another criteria for signal routing is the ability to direct a signal received from one of a plurality of input fibers or ports to any of a plurality of output fibers or ports without regard to the frequency of the optical signal.

Free-space optical crossconnects allow interconnecting among input and output ports in a reconfigurable switch fabric. An example of such an optical crossconnect utilizing mirco-electromechanical systems (MEMS) tilting mirror devices is disclosed in commonly owned and copending U.S. patent application Ser. No. 09/410,586, filed Oct. 1, 1999. By adjusting the tilt angles of the MEMS mirror devices, optical signals can be directed to various destinations, i.e. to numerous output fibers.

MEMS devices and, in particular, tilting mirror devices are susceptible to unwanted movement or drift due to external factors such as temperature changes and mechanical fatigue experienced by actuator elements used to deploy and control the individual mirror elements. As a result, optical signal power may be lost due to misalignment of the reflected optical signal with its intended target (e.g. an output fiber). Accordingly, a system is desired to monitor MEMS optical crossconnect configuration to provide for displacement adjustment.

SUMMARY OF THE INVENTION

An optical crossconnect device having a monitoring feature for detecting optical signal drift is provided. The device provides optical connection of optic signals between input fibers and output fibers by using a MEMS tilt mirror array. The MEMS array includes a plurality of tiltable mirror elements which are positionable in an intended orientation for directing optical signals, but which are susceptible to drift that causes degradation in the optical coupling of the signals to the output fibers. A monitoring device positioned outside of the optical path dynamically monitors the position of one or more of the mirror elements to detect drift.

In a preferred embodiment, the monitoring device is a camera for obtaining an image of one or more mirror elements.

In another embodiment, the monitoring device comprises an optical transmitter and an optical receiver for transmitting a test signal through the optical crossconnect to monitor mirror position drift.

In yet another embodiment, a pattern is formed on one or more of the mirror elements and an image or reflection of the pattern is obtained for determining the presence of mirror drift.

A method is also described for monitoring mirror element positions of mirror elements in a MEMS tilt mirror array used in an optical crossconnect. The method is used with a MEMS mirror array having mirror elements disposed at desired tilt positions for crossconnecting an optic signal between an input fiber and an output fiber along an optical path. A monitoring device disposed outside of the optical path monitors the positions of the mirror elements to detect when position drift occurs. The mirror positions are then adjusted by forming control signals based on the detected drift and applying the control signals to the drifted mirror elements.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate and explain the structures and procedures described herein.

BRIEF DESCRIPTION OF THE DRAWINGS

In the drawings, wherein like reference numerals denote similar elements throughout the several views.

DETAILED DESCRIPTION OF THE PREFERRED EMBODIMENTS

Figure 1:
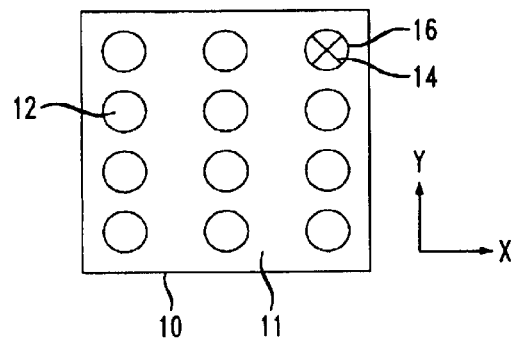
FIG. 1 is a planar view of an example of a MEMS mirror array used in connection with the present invention.

Arrays of two-axis tilt mirrors implemented using micro-electromechanical systems (MEMS) technology in accordance with the invention allow for the construction of large scale optical crossconnects for use in optical systems. Optical crossconnects are commonly employed to connect a number of input optical paths to a number of output optical paths. A typical requirements of optical crossconnects is that any input be capable of being connected to any output. One example of a MEMS mirror array 10 is depicted in FIG. 1. The mirror array 10 includes a plurality of tilt mirrors 12 formed on a substrate 11, mounted to actuation members or springs 14 and controlled by electrodes (not shown). Each mirror 12 is approximately 100–500 Microns across, may be shaped as square, circular or elliptical, and is capable of operatively rotating or tilting about orthogonal X-Y axes, with the tilt angle being selectively determined by the amount of voltage applied to the control electrodes. Further details of the operation of the MEMS mirror array 10 are found in copending U.S. patent application Ser. No. 09/415, 178, filed Oct. 8, 1999, the entire contents of which are incorporated herein by reference. The general concept of utilizing two or more such tilt mirror arrays 10 to form an optical crossconnect is disclosed in copending U.S. patent application Ser. No. 09/410,586, filed Oct. 1, 1999, the entire contents of which are also incorporated herein by reference.

Figure 2:
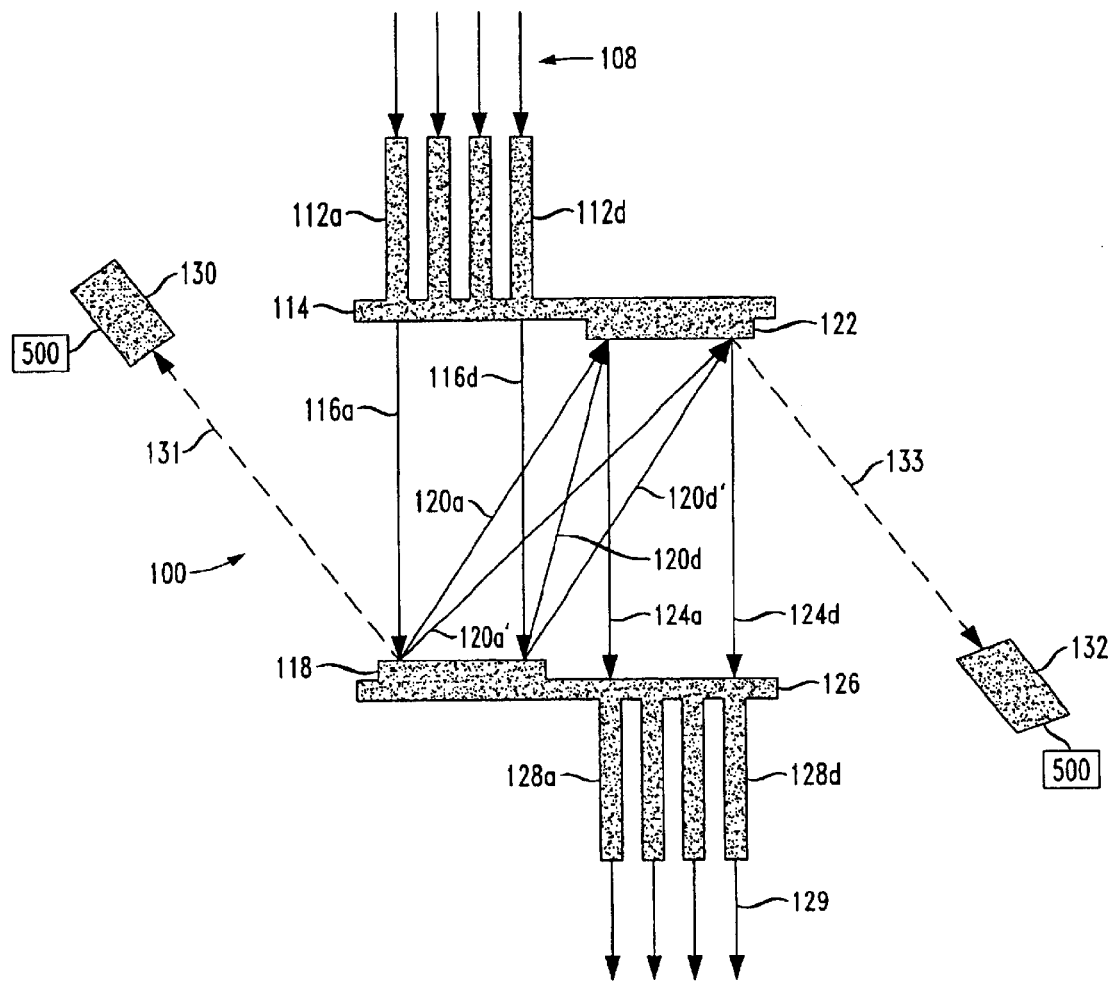
FIG. 2 is a schematic representation of an optical crossconnect monitoring device in accordance with one embodiment of the present invention.

The use of one or more MEMS tilt mirror arrays in conjunction with a lens array is disclosed in co-pending U.S. patent application Ser. No. 09/512,174, filed Feb. 24, 2000, the entire content of which is also incorporated herein by reference. As disclosed in that application, various optical crossconnect configurations of compact size (i.e. minimal spacing between crossconnect components) and exhibiting minimal optical power loss can be realized. One such optical crossconnect 100 discussed in the aforementioned application is depicted in FIG. 2. Crossconnect 100 receives input optic signals 108 through a plurality of optic fibers 112, preferably formed in an array as is well known in the art. For ease of illustration fiber array 110 is shown as a one-dimensional array having four fibers 112*a*, 112*b*, 112*c*, 112*d*. It is in any event to be understood that fiber array 112 as well as other fiber arrays discussed herein are preferably two-dimensional arrays such as, for example, N×N arrays.

Fiber array 112 transmits the optical signals 108 to an array of lenses 114 that function as collimating lenses. The lens array 114 is positioned relative to fiber array 112 so that each lens communicates with a corresponding fiber for producing pencil beams 116 from the optic signals 118. Thus, beam 116*a* is produced from a signal carried by fiber 112*a*, beam 116*d* is produced from a signal carried by fiber 112*d*, etc.

A first MEMS tilt mirror array 118, also referred to as the input array, is positioned in alignment with lens array 114 so that each mirror element 12 will receive a corresponding beam 116. The mirror elements are operatively tilted, in a manner discussed in application Ser. No. 09/415,178, to reflect the respective beams 116 to a second or output MEMS mirror array 122 positioned in optical communication with MEMS array 118. Depending on the tilt angle of each mirror element in input MEMS array 118, the reflected signals can be selectively directed to specific mirror elements in output MEMS array 122. To illustrate this principle, beam 116*a* is shown in FIG. 2 generating reflection beams 120*a* and 120*a*' and beam 116*d* is shown in the figure generating reflection beams 120*d* and 120*d*'. These beams are received by mirror elements in the output MEMS array 122 and are directed as beams 124 to an output lens array 126. An output fiber array 128 is aligned with lens array 126 to receive and output optical signals 129. Thus, lens array 126 couples beams 124 into the output fiber array 128.

The rotatable positions or orientations of the individual mirror elements 12 of arrays 118 and 122 are, however, affected by environmental conditions such as temperature changes. As a result, once the positions of the mirror elements 12 are set, those intended positions may drift or change due (for example) to temperature variations, thereby adversely causing inefficient or unintended signal routing and associated power losses. A similar problem may be caused by mechanical fatigue and stress on the actuators used to control mirror position, and by electric charging effects on the actuators. These variations can result in conditions referred to as macro-drift, wherein all of the mirror elements in an array drift by an equal amount, and micro-drift, in which only some of the mirror element positions unintendedly change.

To detect such unwanted mirror drift in optical crossconnects in accordance with the present invention to compensate for actual mirror positions, one or more monitoring devices 130, 132 are included in the crossconnect system 100 shown in FIG. 2. The monitoring devices may be used to detect both macro-drift and micro-drift conditions of the MEMS mirror arrays 118, 122. For example, each monitoring device may be a camera or other imaging devices which operates independently of other cameras. Each camera is shown in FIG. 2 positioned outside of the optical path of the crossconnect (i.e. the path in which optical signal 116 travels through the crosssconnect to fiber array 128) and obtains an image of its respective MEMS array. Thus, camera 130 is focussed on MEMS array 118 and camera 132 is focussed on MEMS array 122. The resulting images are then compared to reference images of mirror array positions stored, for example, in a controller block 500 containing a processor and a database (not shown) in a manner well-known to those having ordinary skill in the art. In the event that an unacceptable amount of drift is detected for the entire mirror array, feedback control signals can be generated by the control block 500 for adjusting the tilt angles to compensate for drift by applying appropriate voltages to the mirror actuators. If on the other hand only certain mirror elements need to be adjusted, these mirrors can be identified, through the aforementioned image comparison with a reference image, and then re-positioned by applying appropriate voltages to the desired actuators.

Figure 3:
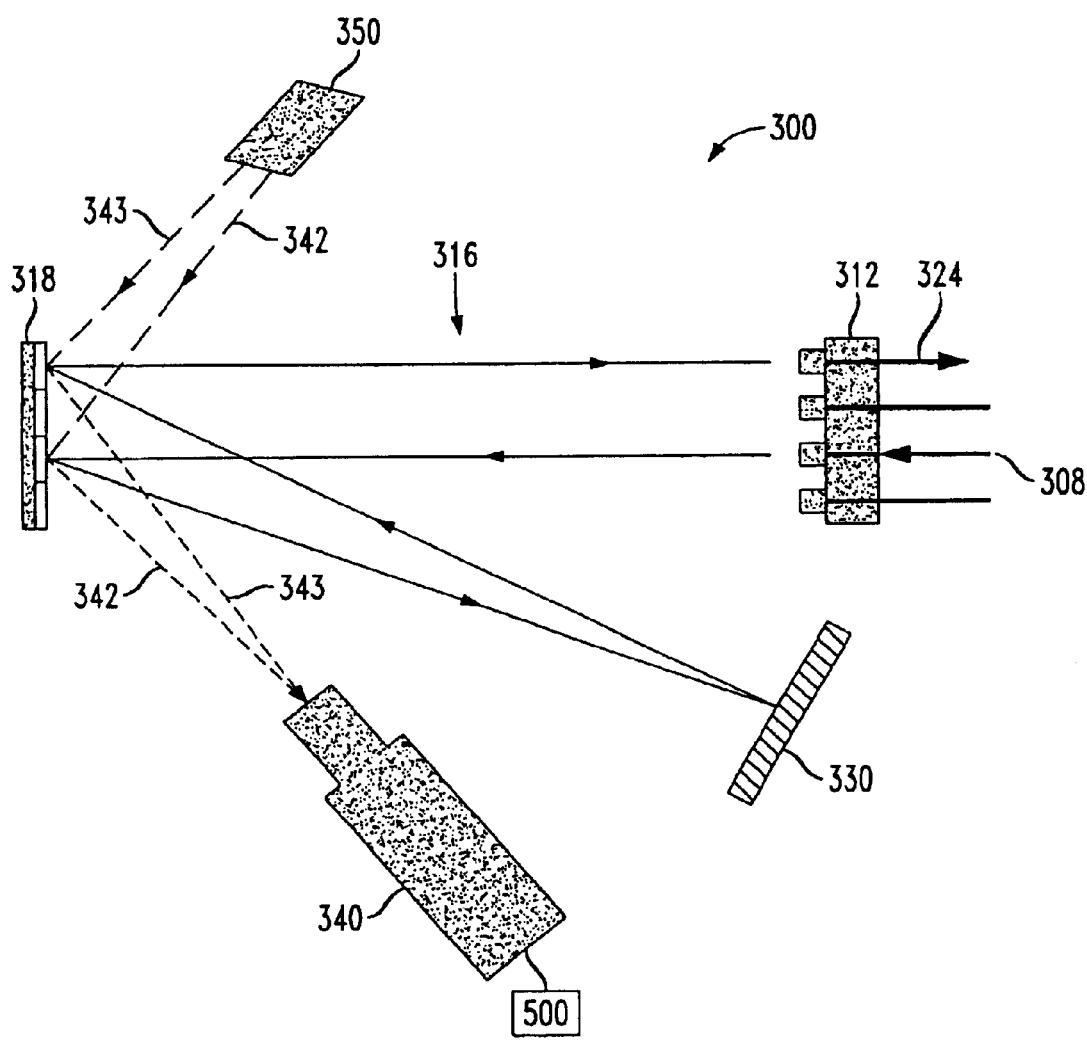
FIG. 3 is a schematic representation of a monitoring device for a "folded" optical crossconnect in accordance with another embodiment of the present invention.

The monitoring system of FIG. 2 can also be employed in connection with a folded crossconnect configuration, as for example shown in FIG. 3, wherein a single input/output fiber array 312, single MEMS mirror array 318, and reflective surface element 330 comprise the folded configuration. A camera 340 positioned outside of the optical path 316 obtains an image 342 of the mirror elements in the array 318 for use in calculating and compensating for detected drift.

As an alternative or in addition to the use of cameras, device 130 (FIG. 2) may comprise one or more illuminators (not shown) for producing, for example, one or more infra-red beams 131, 133 directed at mirror arrays 118, 122 and devices 130, 132 may comprise an infra-red detector for detecting the reflected infra-red beams. The illumination source may produce a test signal having a different wavelength from the signal wavelength or can be modulated to discriminate and distinguish it from the signal wavelength. The infrared beams 131, 133 may be pencil beams for illuminating a single mirror element which may be designated as a reference element, such as element 16 in FIG. 1. The reflected infra-red signal will pass through the optical crossconnect for receipt by its respective infra-red detector. For example, for an infra-red test beam directed at a mirror element in array 118, the test beam will be reflected and directed to detector 130, and for an infrared beam directed at a mirror element in array 122, the test beam will be received by detector 132. Depending on the characteristics of the reflected and received infra-red beams—such as a reduction in beam power or intensity and/or a change of position on the detector at which the beam is received, etc.—macrodrift can be dynamically detected. For example, and as a result of a temperature change, drift may occur among all mirror elements in mirror arrays 118, 122. By measuring and detecting drift from a reference mirror element (e.g. mirror 16), the mirror arrays can be adjusted to compensate for drift by generating appropriate feedback signals from control blocks 500 to be applied to mirror control actuators.

It will be appreciated that both devices 130, 132 can operate as combined or dual-function source/receiver devices wherein each device produces a signal for receipt by the other and receives a signal produced by the other. Likewise, and in connection with the folded configuration of FIG. 3, device 340 can be implemented by or supplemented with a detector/receiver for receiving reflected test signals 342, 343 generated by a source such as an infrared source 350 for illuminating one or more mirror elements 12.

For micro-drift compensation, the devices 130, 132 in the system 100 of FIG. 2 and the device 340 in the system 300 of FIG. 3 can be connected to a scanning device which may be found in controller block 500 for changing the position of the test beam (beam 130 in FIG. 2 and beam 342 in FIG. 3) to illuminate multiple mirror elements. For example, the scanner can adjust the test beam position to illuminate one mirror element 12 at any given time for determining the tilt angle of each illuminated mirror.

As another alternative, the reference mirror element 16 may be formed with an imaging pattern 14, as for example by surface etching. This modification allows for the use of pattern recognition techniques wherein a generated pattern is received or monitored by a detector or camera. Detected movement of the pattern indicates mirror drift. Pattern 14 may be specifically oriented to generate a unique pattern that is observable in scattered light so as to provide an enhanced signature when a light beam is centered on mirror 16. A single unique pattern may be used for all mirrors, or each mirror can be coated with its own unique pattern. Entire pathways through the mirror array may be defined by unique patterning, thus helping to guide light beams through the array during switching.

Thus, while there have shown and described and pointed out fundamental novel features of the invention as applied to preferred embodiments thereof, it will be understood that various omissions and substitutions and changes in the form and details of the methods disclosed and devices illustrated, and in their operation, may be made by those skilled in the art without departing from the spirit of the invention. For example, it is expressly intended that all combinations of those elements and method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An optical crossconnect monitoring device for directing optical signals received from a plurality of input optic fibers along an optical path to a plurality of output optic fibers, and for detecting spatial shifts of the optical signals, comprising:
a moveable mirror formed on a substrate and positioned within the optical path for receiving optical signals from one of the plurality of input optic fibers and directing said received signals along the optical path specific ones of the plurality of output optic fibers, said mirror being operatively tiltable about a rotational axis to an intended angular orientation relative to said substrate for providing desired directional reflection of a one of the optical signals received by said mirror; and
an optical monitoring device positioned outside of the optical path and in optical communication with said mirror for optically detecting rotational drift of said mirror relative to said intended angular orientation, said detected rotational drift being indicative of optical signal spatial shifts.

2. The device of claim 1, wherein said moveable mirror comprises a MEMS mirror array having a plurality of moveable mirror elements.

3. The device of claim 2, wherein said monitoring device comprises a camera oriented for obtaining an image of said mirror array.

4. The device of claim 3, wherein one of said mirror elements is formed with a pattern for receipt of an image of said pattern by said camera.

5. The device of claim 2, wherein said monitoring device comprises an illumination device for illuminating a selected one of said plural mirror elements with a test optical signal and a receiver for receiving the test signal after reflection of the test optical signal from said selected mirror element.

6. The device of claim 5, wherein one of said mirror elements comprises a pattern for producing a reflection of said pattern for receipt by said receiver when said selected mirror element is illuminated by the test signal.

7. The device of claim 5, wherein the plurality of input optic fibers and the plurality of output optic fibers form an array of optic fibers, said device further comprising a reflector element disposed in optical communication with said MEMS mirror array for receiving optical signals from said MEMS mirror array and for reflecting the received optical signals back to said MEMS mirror array, said reflected optical signals being redirected by said MEMS mirror array back to said array of optic fibers for receipt by the output optic fibers.

8. The device of claim 7, wherein said reflector element receives the test signal from said illumination device and reflects the test signal to said receiver.

9. The device of claim 7, wherein said illuminating device and said receiver are integrally formed.

10. The device of claim 2, wherein the plurality of input optic fibers and the plurality of output optic fibers form an array of optic fibers, said device further comprising a reflector element disposed in optical communication with said MEMS mirror array for receiving optical signals from said MEMS mirror array and for reflecting the received optical signals back to said MEMS mirror array, said reflected optical signals being redirected by said MEMS mirror array back to said array of optic fibers for receipt by the output optic fibers.

11. The device of claim 2, further comprising a controller connected to said monitoring device and operable for generating a control signal in response to the detected rotational drift.

12. A method of monitoring a spatial shift of optical signals in an optical crossconnect device which directs optical signals received from a plurality of input optic fibers along an optical path to a plurality of output optic fibers, comprising the steps of:
placing a mirror formed on a substrate within the optical path for receiving optical signals from one of the plurality of input optic fibers and directing said received signals along the optical path to specific ones of the plurality of output optic fibers, said mirror being operatively tiltable about a rotational axis to an intended angular orientation relative to said substrate for providing desired directional reflection of one of the optical signals received by said mirror;
positioning an optical monitoring device outside of the optical path and in optical communication with said mirror; and
optically detecting rotational drift of said mirror relative to said intended angular orientation using the optical monitoring device, said detected rotational drift being indicative of optical signal spatial shifts.

13. The method of claim 12, wherein said moveable mirror comprises a MEMS mirror array having a plurality of moveable mirror elements.

14. The method of claim 13, further comprising the steps of determining which of said plural mirror elements have experienced rotational drift, generating control signals from said optically detecting step, and using said control signals to operatively adjust rotatable positions of said rotationally drifted mirror elements.

15. The method of claim 13, wherein said positioning step further comprises the step of positioning an optical signal transmitter outside of the optical path for generating an optical test signal directed at said MEMS array for reflection by said MEMS array, and positioning an optical receiver outside of said optical path for detecting said reflected test signal after reflection of the test signal from the MEMS array, and wherein said monitoring step further comprises monitoring a power level of said test signal received by said receiver.

16. The method of claim 13, wherein at least one of said mirror elements is a pattern mirror element, and wherein said positioning step further comprises positioning an optical signal transmitter outside of the optical path for generating an optical test signal directed at said pattern mirror element for reflection by said pattern mirror element to thereby generate an image of the pattern, and positioning an optical receiver outside of said optical path for receiving and detecting said pattern image.

* * * * *